United States Patent [19]
Gärtner et al.

[11] Patent Number: 6,050,555
[45] Date of Patent: Apr. 18, 2000

[54] VIBRATION DAMPER

[75] Inventors: Hanno Gärtner, Gorxheimertal; Bernhard Röhrig, Heppenheim; Richard Schenk, Lampertheim, all of Germany

[73] Assignee: Firma Carl Freudenberg, Weinheim, Germany

[21] Appl. No.: 09/316,551

[22] Filed: May 24, 1999

Related U.S. Application Data

[62] Division of application No. 08/772,204, Dec. 20, 1996.

[30] Foreign Application Priority Data

Dec. 20, 1995 [DE] Germany ................................ 19547661

[51] Int. Cl.⁷ ........................................................ F16F 7/00
[52] U.S. Cl. ........................................ 267/141; 267/140.13
[58] Field of Search .................................... 267/141, 292, 267/136, 139, 140, 140.13, 141.1–141.7, 201, 294, 293, 140.12, 64.11, 113, 35; 188/378, 379, 380

[56] References Cited

U.S. PATENT DOCUMENTS

| | | | |
|---|---|---|---|
| 2,600,090 | 6/1952 | Barber et al. | 267/140.13 |
| 4,391,436 | 7/1983 | Fishbaugh | 267/141.1 |
| 4,577,842 | 3/1986 | Shtarkman | 267/140.13 |
| 4,955,588 | 9/1990 | Reuter et al. | 267/140.13 |
| 5,295,671 | 3/1994 | Nakagaki et al. | 267/140.13 |
| 5,456,454 | 10/1995 | Schulz et al. | 267/293 |

*Primary Examiner*—Chris Schwartz
*Assistant Examiner*—Melanie Talavera
*Attorney, Agent, or Firm*—Kenyon & Kenyon

[57] ABSTRACT

A vibration damper includes at least one damper mass and at least one bush bearing, the bush bearing having an inner supporting core surrounded with radial clearance by an outer supporting sleeve, a spring mass made of elastomer material that extends essentially radially and joins the supporting core and the supporting casing being arranged in the gap formed by the clearance. The damper mass has an essentially pot-shaped recess, in which the bush bearing is arranged, the supporting casing being pressed in an essentially airtight manner into the recess, and the hollow space delimited by the damper mass and the bush bearing being designed as a pneumatic spring.

4 Claims, 2 Drawing Sheets

VIBRATION DAMPER

CROSS-REFERENCE TO RELATED APPLICATION

This application is a division of U.S. Ser. No. 08/772,204, filed Dec. 20, 1996.

FIELD OF THE INVENTION

The invention relates to a vibration damper comprising at least one damper mass and at least one bush bearing, the bush bearing having an inner supporting core, which is surrounded with radial clearance by an outer supporting sleeve, a spring body made of elastomer material and arranged in the gap formed by the clearance, wherein the spring body extends essentially radially and joins the supporting core and the supporting sleeve.

BACKGROUND

In generally known vibration dampers, it is only possible, in particular, to damp low-frequency, large-amplitude vibrations by using spring bodies made of high-damping elastomer mixtures. On the other hand, when high-damping elastomer mixtures are used, insulation against high-frequency vibrations is not very satisfactory. Heretofore, no provision has been made in known vibration dampers to separate the cushioning and damping functions.

In view of the deficiencies of existing vibration dampers, there remains a need to further develop a vibration damper which has separate cushioning and damping functions, so that a larger selection of elastomer mixtures can be used to facilitate adjustment to the respective applications, and so that the vibration damper will provide a broad-band vibration insulation/damping within a wide frequency range.

SUMMARY OF THE INVENTION

A vibration damper is provided which includes at least one damper mass and at least one bush bearing, the bush bearing having an inner supporting core surrounded with radial clearance by an outer supporting sleeve, a spring mass made of elastomer material that extends essentially radially and joins the supporting core, and the supporting casing being arranged in the gap formed by the clearance. The damper mass has an essentially pot-shaped recess, in which the bush bearing is arranged, the supporting casing being pressed in an essentially airtight manner into the recess, and the hollow space delimited by the damper mass and the bush bearing being designed as a pneumatic spring.

It is advantageous that the cushioning and damping of the vibration damper according to the invention can be optimized separately from one another, depending on the material and the design of the spring body and the construction of the pneumatic spring. Because the elastomer material is intended primarily for cushioning the vibration damper, and the damping action is essentially effected by the hollow space designed as a pneumatic spring, the elastomer of the spring body can be selected so as to enable relatively small-amplitude, high-frequency vibrations to be insulated in a superior manner. Large-amplitude, low-frequency vibrations are damped by the air volumes in the pneumatic spring enclosed in the hollow space.

In accordance with one advantageous embodiment, the recess has a diameter that varies by steps in the direction in which the vibrations are introduced and is delimited on the bottom by a blind-hole-shaped depression, the supporting core being surrounded with radial clearance, and the clearance is conceived to act as an annular choke gap. This type of hollow space form causes the pneumatic spring to harden progressively as the spring path increases. The recess is preferably reduced twofold starting from the installation space in the supporting sleeve, the smallest diameter of the depression being only slightly larger than the diameter of the supporting core that dips into it. The ratio of the smallest diameter of the depression to the largest outer diameter of the supporting core is greater than 1 and is preferably 1.25 at the most. When large-amplitude, low-frequency vibrations are introduced, the vibration damper initially has comparatively soft characteristics in the direction in which the vibrations are introduced, a gradual progressive hardening setting in as the spring path increases. If the supporting core overshoots the smallest diameter of the depression with its front side, the gaseous, compressible medium enclosed by the damper mass and the supporting body is only able to escape via the annular choke gap in the direction of the spring body. As a result, the large-amplitude, low-frequency vibrations introduced are damped.

The supporting core can be completely enclosed by the elastomer material of the spring body on the side facing the hollow space, it being possible for the material on the front side of the supporting body to have an essentially lens-shaped depression, which is delimited on the periphery by an annular stop buffer. The stop buffer produces additional damping in the end position. Such a design is especially useful when unusually large-amplitude vibrations are introduced into the damper in the form of shocks. This can happen, for instance, when the vibration damper is used in a motor vehicle that is driven over the edge of a curb. Such stresses, which occur only very infrequently during normal operational use of the vibration damper, are absorbed in that, in addition to the damping described above, the annular stop buffer comes in contact with the bottom of the depression, such contact with the stop not being made abruptly, but comparatively softly.

To seal the hollow space almost completely, the elastomer material of the spring body, which is vulcanized between the supporting core and the supporting sleeve, forms static sealing areas, which cover the bottom front side of the supporting sleeve, for example, and engage sealingly with the inner wall of the damper mass delimiting the recess.

DETAILED DESCRIPTION

Figure 1:
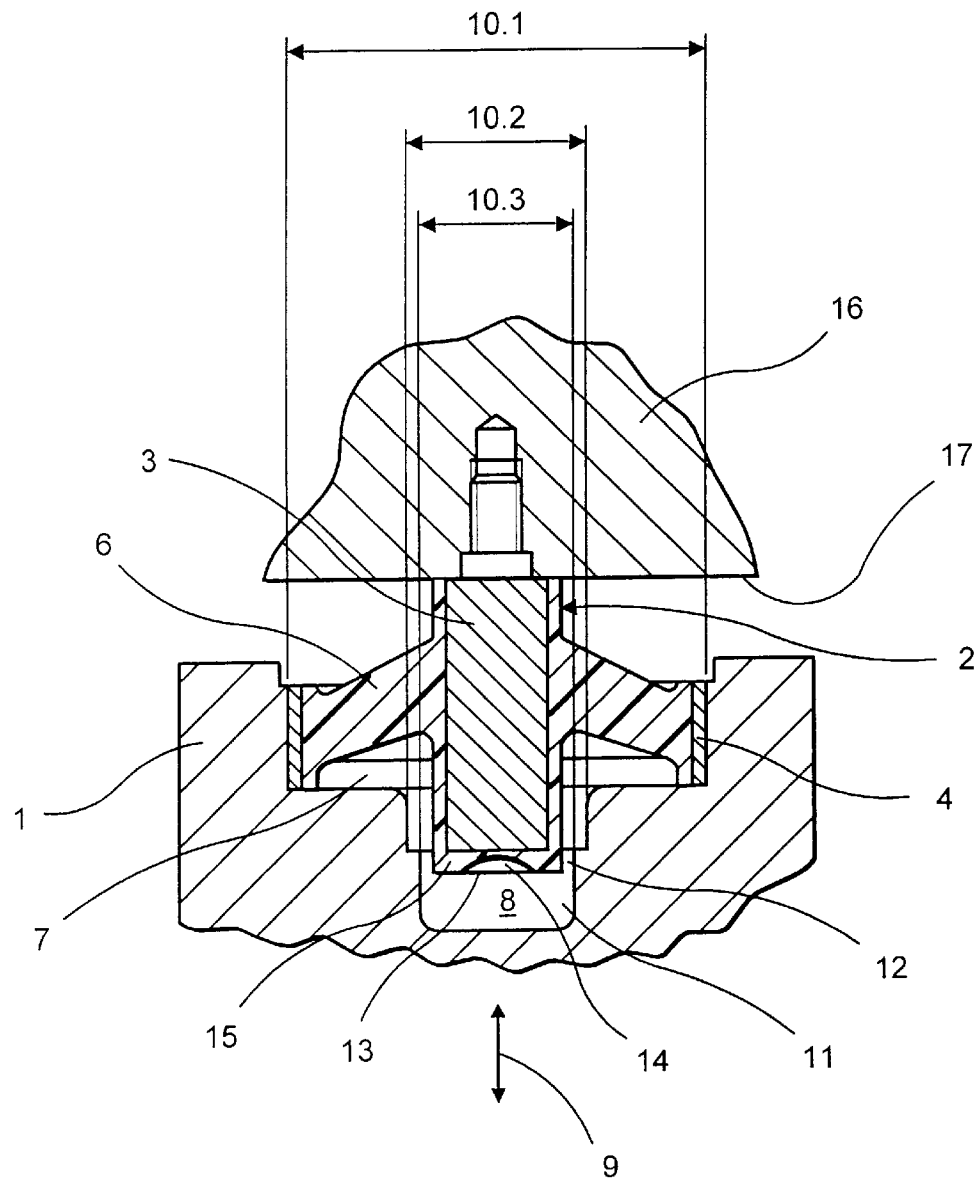
FIG. 1 shows a sectional view of a first exemplary embodiment of a vibration damper according to the invention.

FIG. 1 shows a first exemplary embodiment of a vibration damper according to the invention which is comprised of a damper mass 1, which is attached to a vibrating component 16 by a bush bearing 2. Bush bearing 2 includes an encircled supporting core 3, which is essentially surrounded on all sides by the elastomer material of spring body 6. Only the front side 17 of the supporting core 3 facing away from recess 7 is free of elastomer material, to ensure a secure attachment, free of manifestations of relaxation, of the vibration damper to vibrating component 16. Supporting core 3 and spring body 6 are surrounded radially on the outside by supporting sleeve 4, the supporting core 3 and the supporting sleeve 4 being joined together by vulcanized spring body 6. On the bottom, recess 7 in damper mass 1 has an outer diameters 10.1, 10.2, 10.3, which are reduced in two steps. Hollow space 8 is delimited by bush bearing 2 and damper mass 1 and is sealed off in an airtight manner from the environment, thus being designed to act as a pneumatic spring. The seal action is produced in that the elastomer material of spring body 6 seals off the front side of the outer supporting sleeve 4 from the damper mass 1.

In the operating state shown here, vibrating component 16 and damper mass 1 are moved toward one another in the axial direction by introduced vibrations 9; the front side 13 of supporting core 3 facing depression 11 already having overshot the edge of the smallest diameter 10.3 of recess 7. The front side 13 of supporting core 3 is completely encased by the elastomer material of spring body 6. An annular stop buffer 15 borders lens-shaped depression 14 on the periphery and is able to be forced into contact with the bottom of depression 11 in response to extreme deflections. This produces additional damping in the end position.

Figure 2:
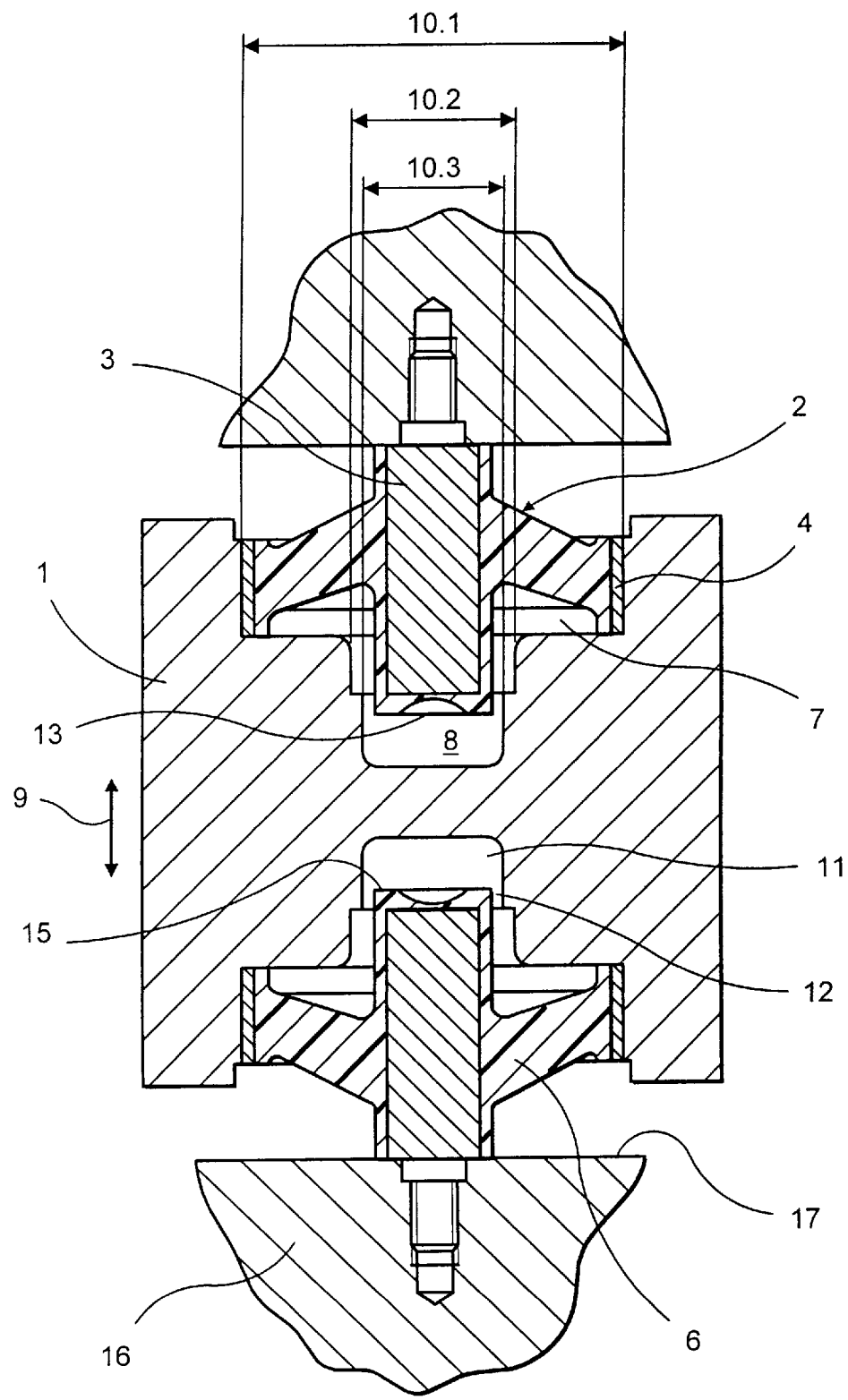
FIG. 2 shows a second exemplary embodiment of a vibration damper in which two bush bearings are used in a tandem arrangement.

FIG. 2 illustrates a second exemplary embodiment of a vibration damper according to the invention, which is formed in mirror symmetry transversely to the direction in which the vibrations are introduced. Provided on the two front sides of damper mass 1 are recesses 7 with matching designs, identically designed bush bearings 2 being pressed into respective recesses 7. The vibration damper shown in FIG. 2 operates with dual action in the direction in which vibrations 9 are introduced.

What is claimed is:

1. A vibration damper comprising:
   at least one damper mass having an essentially pot-shaped recess; and
   and at least one bush bearing arranged in the pot-shaped recess, the bush bearing having
      an inner supporting core which is surrounded with radial clearance by an outer supporting sleeve, the damper mass and the bush bearing defining a hollow space which acts as a pneumatic spring, and
      a spring body made of elastomer material, which extends essentially radially and joins the supporting core and the supporting sleeve, the spring body being arranged in the gap formed by the radial clearance,
   wherein the outer supporting sleeve is pressed in an essentially airtight manner into the pot-shaped recess.

2. A vibration damper comprising:
   at least one damper mass having an essentially pot-shaped recess; and
   and at least one bush bearing arranged in the pot-shaped recess, the bush bearing having
      an inner supporting core which is surrounded with radial clearance by an outer supporting sleeve, the damper mass and the bush bearing defining a hollow space which acts as a pneumatic spring, and
      a spring body made of elastomer material, which extends essentially radially and joins the supporting core and the supporting sleeve, the spring body being arranged in the gap formed by the radial clearance,
   wherein the outer supporting sleeve is pressed in an essentially airtight manner into the pot-shaped recess, and wherein the pot-shaped recess has three diameters that progressively vary by steps in the direction in which vibrations are introduced, the recess being delimited on the bottom by a blind-hole-shaped depression which surrounds the supporting core with radial clearance, wherein the clearance acts as an annular choke gap.

3. The vibration damper of claim 2, wherein the ratio of the smallest diameter of the recess to the largest diameter of the supporting core is greater than 1.

4. The vibration damper of claim 3, wherein the ratio of the smallest diameter of the recess to the largest diameter of the supporting core is not more than 1.25.

* * * * *